United States Patent
Kasher et al.

(10) Patent No.: US 7,411,995 B2
(45) Date of Patent: Aug. 12, 2008

(54) APPARATUS AND RELATED METHODS TO AID IN SYSTEM IDENTIFICATION IN A HETEROGENEOUS COMMUNICATION SYSTEM ENVIRONMENT

(75) Inventors: Assaf Kasher, Haifa (IL); Shmuel Levy, Q. Tivon (IL)

(73) Assignee: Intel Corporation, Santa Clara, CA (US)

( * ) Notice: Subject to any disclaimer, the term of this patent is extended or adjusted under 35 U.S.C. 154(b) by 625 days.

(21) Appl. No.: 11/027,032

(22) Filed: Dec. 30, 2004

(65) Prior Publication Data

US 2006/0146943 A1   Jul. 6, 2006

Related U.S. Application Data

(63) Continuation-in-part of application No. 11/015,870, filed on Dec. 17, 2004.

(51) Int. Cl.
  *H04L 27/30*    (2006.01)
(52) U.S. Cl. .................. 375/141; 375/267; 375/299; 370/203; 370/437; 370/464
(58) Field of Classification Search ............... 375/140, 375/141, 146, 260, 295, 299, 267; 370/203, 370/321, 347, 464
See application file for complete search history.

(56) References Cited

U.S. PATENT DOCUMENTS

| | | | |
|---|---|---|---|
| 6,201,830 B1 * | 3/2001 | Chellali et al. | ............... 375/222 |
| 6,999,778 B2 * | 2/2006 | DiBuduo | ................. 455/456.1 |
| 2005/0152314 A1 * | 7/2005 | Sun et al. | |
| 2006/0045040 A1 * | 3/2006 | Tian et al. | |

* cited by examiner

*Primary Examiner*—Dac V. Ha
(74) *Attorney, Agent, or Firm*—Kacvinsky LLC

(57) ABSTRACT

An apparatus and associated methods to aid in system identification in a heterogeneous communication environment is generally described herein.

11 Claims, 3 Drawing Sheets

APPARATUS AND RELATED METHODS TO AID IN SYSTEM IDENTIFICATION IN A HETEROGENEOUS COMMUNICATION SYSTEM ENVIRONMENT

PRIORITY APPLICATIONS

This patent is a continuation-in-part of, and claims priority to U.S. patent application Ser. No. 11/015,870 filed Dec. 17, 2004 by the same inventors having the same title.

TECHNICAL FIELD

Embodiments of the invention are generally directed to communication systems and, more particularly, to an apparatus and related methods to aid in system identification in a heterogeneous communication system environment, e.g., to facilitate backward compatibility in a wireless communication system.

BACKGROUND

The need for increased data throughput and reliability has ushered a rapid advance in the development of next generation wireless networking technologies. One example of this rapid advance is illustrated within the IEEE 802.11 family of wireless local area network (WLAN) standards. To avoid fragmentation of the market with a proliferation of incompatible standards, a design goal for subsequent iterations of the 802.11 standard is that compatible devices be backward compatible with prior generation, or legacy, devices.

Illustratively, there is a requirement in the evolving next generation high-throughput (HT) WLAN (802.11n) standard that compatible devices be able to operate concurrently with the prior generation, 802.11a or 0.11 g devices in the same channel. One suggested solution is to use a rotated (BPSK) modulation, or a quadrature BPSK (Q-BPSK) for a $1^{st}$ HT signal field of a HT WLAN packet. It will be appreciated by those skilled in the art that differentiating between a BPSK packet rotated by ninety-degrees (90°) and a packet modulated using 16-QAM may be difficult when the receiver suffers a poor signal-to-noise ratio (SNR). As such, the proposed solution may not be robust to delivered guaranteed performance under all network conditions.

BRIEF DESCRIPTION OF THE DRAWINGS

Embodiments of the present invention are illustrated by way of example, and not by way of limitation, in the figures of the accompanying drawings in which like reference numerals refer to similar elements and in which.

DETAILED DESCRIPTION

Figure 1:
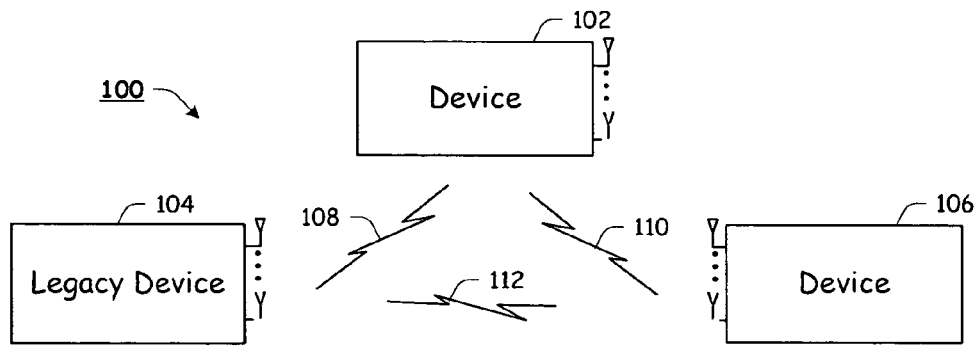
FIG. 1 is a block diagram of an example communication system within which embodiments of the invention may be practiced.

Embodiments of an apparatus and associated methods to aid in the identification of a communication system in a heterogeneous communication environment are generally presented. It will be appreciated from the description to follow that various aspects of embodiments disclosed herein may facilitate backward compatibility to enable non-legacy communication devices to interoperate with legacy communication device.

By way of example for purposes of illustration, and not limitation, embodiments of the invention described herein will be developed within the context of an example implementation involving the aforementioned 802.11 family of WLAN communication standards and associated protocols. In this regard, according to one example embodiment, a non-legacy communication channel may include characteristics of an 802.11n compliant channel for use by an 802.11n compliant transceiver (e.g., one or more transmitter(s) and/or receiver(s)), although the invention is not limited as such. A legacy communication channel may include characteristics of one or more of an 802.11a and/or 802.11g compliant channel generally used by an 802.11a or an 802.11g compliant transceiver, although the invention is not limited in this regard.

According to one embodiment, both legacy and non-legacy communication channels may be a multi-carrier (e.g., an Orthogonal Frequency Division Multiplexing (OFDM)) communication channel comprised of a number of sub-carriers. According to one example embodiment, the communication channel is comprised of some number of payload-bearing sub-carriers, and a (typically smaller) number of pilot sub-carriers. The pilot sub-carriers are typically pre-ordained with the receiving devices, and are used by the receiving devices for purposes of phase and timing tracking. The combination of subcarriers forms an OFDM symbol, which may comprise at least a subset of one or more communication packets (an example of which is discussed with reference to FIG. 4).

According to one aspect of an embodiment discussed more fully below, a transmitter may generate a non-legacy communication channel wherein an attribute of at least a subset of the sub-carriers is modified vis-à-vis a legacy communication channel. According to one example embodiment, the transmitter may generate the non-legacy communication channel wherein a polarity attribute of at least a subset of the subcarriers is modified, e.g., reversed, to distinguish a legacy communication channel from a non-legacy communication channel. In some embodiments, the modification of pilot tone polarity may well be employed in combination with, or in place of, the conventional Q-BPSK modulation technique introduced above, although the invention is not limited in this regard.

On the receiver side, according to one example embodiment, an identification agent is introduced that may analyze one or more attributes of a received communication channel to determine whether it is a legacy communication channel. According to one embodiment, a receiver may implement a method comprising receiving one or more wireless communication signals associated with a communication channel, and analyzing at least a phase of at least a subset of one or more pilot signals associated with the received communication channel to determine whether a source of the communication channel is a legacy communication device.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Technical detail regarding some of the operating characteristics of such devices and associated communication channels may be found in, e.g., the IEEE 802.11, 1999 Edition; Information Technology Telecommunications and Information Exchange Between Systems—Local and Metropolitan Area Networks—Specific Requirements, Part 11: WLAN Medium Access Control (MAC) and Physical (PHY) Layer Specifications, its progeny and supplements thereto (e.g., 802.11a, 0.11g and 0.11n). See, also, the IEEE Std 802.16-2001 IEEE Std. 802.16-2001 IEEE Standard for Local and Metropolitan area networks Part 16: Air Interface for Fixed Broadband Wireless Access Systems, its progeny and supplements thereto (e.g., 802.16a, 0.16d, and 0.16e). Such specifications are expressly incorporated herein for all purposes.

Example Communications Environment

In FIG. 1, a block diagram of an example wireless communication environment is depicted within which embodiments of the invention may well be practiced. In accordance with the illustrated example embodiment of FIG. 1, an example communications environment 100 is depicted comprising three (3) wireless communication devices 102, 104, and 106, wherein at least device 104 is characterized a legacy device. According to one embodiment, legacy device 104 may be an 802.11a or a 0.11g device, while devices 102 and 106 may be 802.11n devices, although the invention is not limited in this regard.

Devices 102, 104 and 106 may each selectively engage in wireless communication with each other via, e.g., communication channel 108, 110, or 112, as depicted, although the invention is not limited in this regard. According to one embodiment, legacy device 104 may generate one or more datagram(s) (e.g., packet, frame, symbol, etc.) for communication via a wireless communication channel 108 with a non-legacy device 102. A graphical representation of a legacy datagram format (400) is provided with reference to FIG. 4, below.

According to one embodiment, a receiver in a non-legacy device (e.g., 102, and/or 104) may include an identification agent (262 in FIG. 2) to determine whether a received communication channel was generated in accordance with a legacy communications protocol (e.g., an 802.11a or 0.11g protocol). In this regard, the identification agent within a device (102, 106) may analyze one or more attributes of one or more signals associated with a communication channel (e.g., 108) to determine whether the communication channel adheres to a legacy communication protocol. More particularly, according to one embodiment, the identification agent may analyze a phase, polarity and the like of one or more of a plurality of pilot signals associated with a received communication channel to determine whether the channel adheres to a legacy communication protocol, although the scope of the invention is not so limited.

According to some embodiments, the identification agent may provide a host device (102, 106) with an indication noting whether the received communication channel adheres to a legacy communication protocol, although the invention is not limited in this respect. Upon receiving such an indication, the host device may adjust one or more communication parameters to facilitate continued communications with the source transmitter associated with the communication channel.

As used herein, the identification agent and the associated methods for distinguishing legacy communication channels from non-legacy communication channels may be implemented in hardware, software, firmware or a combination thereof. Similarly, devices 102-106 are intended to represent a wide range of computing and communication devices including, but not limited to in any combination laptop computer(s), palmtop computer(s), desktop computer(s), set-top boxes, cellular telephone(s), cordless telephone(s), personal digital assistant(s), personal communication service (PCS) handsets, wireless LAN station(s) and/or access points, wireless metropolitan area network (WMAN) basestation(s) and/ or subscriber station(s) and/or mobile subscriber station(s), and the like.

Moreover, although not particularly depicted, the identification agent introduced above and developed more fully below need not be implemented within one of the communicating devices, but may be an external element elsewhere in the communications environment 100 and dynamically accessed by the various devices (102-106) as needed to perform the functions described herein. According to one embodiment, although not shown, any one or more of devices 102-106 may be coupled to (or, through) another wireless or wireline communication network.

Example Architecture(s)

Figure 2:
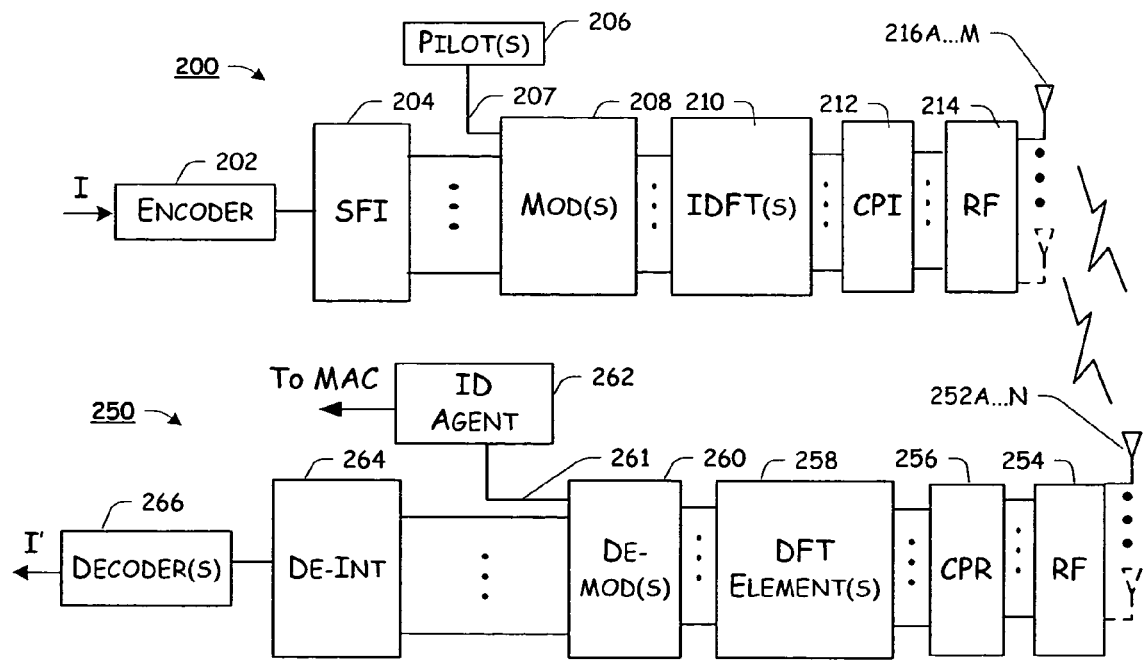
FIG. 2 is a block diagram of an example transceiver architecture depicting aspects of an example embodiment.

Turning to FIG. 2, a block diagram of an example transmitter architecture and an example receiver architecture is presented according to an example embodiment. To illustrate these architectures within the context of a communication between two devices, a transmitter 200 from one device (e.g., 102) and a receiver 250 from another device (e.g., 104) associated with a communication link (108) are depicted. Those skilled in the art will appreciate that a transceiver (i.e., comprising one or more transmitter(s) and receiver(s)) in either device (102, 104) may well comprise the transmitter architecture and/or the receiver architecture as detailed in FIG. 2, although the scope of the invention is not limited in this regard.

According to the example embodiment of FIG. 2, transmitter 200 is depicted comprising one or more of encoder 202, interleaver(s) 204, pilot tone generator(s) 206 to generate one or more pilot signals 207, modulator(s) 208, inverse discrete Fourier transform element(s) 210, cyclical prefix (or, guard interval) insertion element(s) 212, radio frequency (RF) processing element(s) 214 and two or more (e.g., substantially omnidirectional) antenna(e) 216A . . . M, each coupled as depicted, to generate a communication channel. In accordance with a first example illustration, transmitter 200 is implemented within a legacy device 102 to generate a legacy communication channel 108. In this regard, pilot signal generator 206 will create one or more pilot signal(s) 207 with a consistent phase and polarity consistent with the 802.11a (or, 0.11g as appropriate) communication protocol. According to one embodiment, at least a subset of the physical characteristics associated with the pilot signal(s) are known a priori by remote receivers, thereby enabling the receiver to accurately detect and then decode them without resort to any other information that may be contained in the rest of the channel.

Conceptually, transmitter 200 is intended to represent any one or more of a number of transmitter(s) known in the art suitable for generation of a wireless communication channel. According to one example embodiment, transmitter 200 may be implemented within a legacy device to generate a legacy multi-carrier communication channel (e.g., an 802.11a or 0.11g compliant communication channel). When implemented within a legacy device, transmitter 200 may generate a legacy multi-carrier communication channel 108 including one or more subcarriers allocated to pilot signal(s), which are generated to have an appropriate phase and/or polarity consistent with the appropriate communication protocol (e.g., 0.11a or 0.11g).

Alternatively, when implemented within a non-legacy device (e.g., 104 or 106), transmitter 200 may generate one or more pilot signal(s) adhering to a legacy communications protocol (e.g., 0.11a and/or 0.11g) and/or a non-legacy communications protocol (e.g., 0.11n). According to one embodiment, the pilot signal(s) generated in accordance with a non-legacy communications protocol may be generated with one or more signal characteristics that are distinct from legacy pilot signals.

According to one embodiment, pilot signal(s) denoting a non-legacy communication channel may be generated to be out of phase and/or of a distinct polarity with respect to a legacy pilot signal, a technique referred to herein as pilot phase inversion. These pilot signals may be depicted as signal fields in a received data packet (see, e.g., FIG. 4), although the invention is not limited in this respect. A pilot signal generator 206 performing pilot phase inversion takes the data for transmission on these pilot sub-carriers and modulates the pilot(s) in the $1^{st}$ HT signal field (422 of FIG. 4) by −1 times the value in the first legacy data field.

But for the ability in some embodiments (e.g., 0.11n compliant embodiments) to generate pilot signals of varying phase and/or polarity, transmitter 200 is intended to represent any of a wide range of wireless transmitters known in the art.

To extract content processed by a remote transmitter (e.g., 200), an example receiver architecture 250 is introduced including an embodiment of an innovative identification agent, 262. According to one example embodiment, receiver 250 is depicted comprising one or more of an radio frequency (RF) front end 254 responsive to the wireless communication channel (e.g., 108) via one or more antenna(e) 252A . . . N, cyclic prefix (or, guard interval) removal element(s) 256, discrete Fourier transform element(s) 258, de-modulator(s) 260, identification agent(s) 262 incorporating one or more aspects of an embodiment of the invention, de-interleaver(s) 264 and one or more decoders 266, each coupled as depicted to generate a representation (I') of the originally transmitted information (I).

Conceptually, the receiver architecture 250 reverses the transmit processing that took place in the remote transmitter 200. Of note for purposes here, an identification agent 262 may receive a subset 261 of the received communication channel from which it may attempt to identify whether the communication channel is a legacy channel or a non-legacy channel. According to one embodiment, identification agent 262 may receive one or more pilot signal(s) 261 associated with the received communication channel (108). According to one embodiment, the pilot signal(s) 261 are received from one or more demodulator(s) 260, although the invention is not limited in this respect.

As described more fully below, identification agent 262 may analyze one or more characteristics of the received pilot signals such as, e.g., a phase, polarity, and the like. According to one embodiment, identification agent 262 may analyze at least a subset of the pilot signals associated with a channel to determine if pilot phase inversion has been employed. In response to such analysis, identification agent 262 may generate an indication denoting whether the analyzed communication channel is a legacy communication channel or a non-legacy communication channel.

According to one embodiment, such indication is sent to a media access controller (MAC) associated with the receiver 250, but the invention is not limited in this regard. According to one embodiment, in response to such indication, the host device may modify one or more communication parameters in order to communicate with the remote device in accordance with the identified communications protocol.

But for the introduction of the identification agent 262 and its associated or equivalent functionality, receiver 250 is intended to represent any of a wide variety of wireless communication receivers. Although depicted in the context of a hardware implementation, those skilled in the art will appreciate that the identification agent 262 may well be implemented in hardware, software, firmware or any combination thereof without deviating from the scope and spirit of the present invention.

Example Operation

Figure 3:
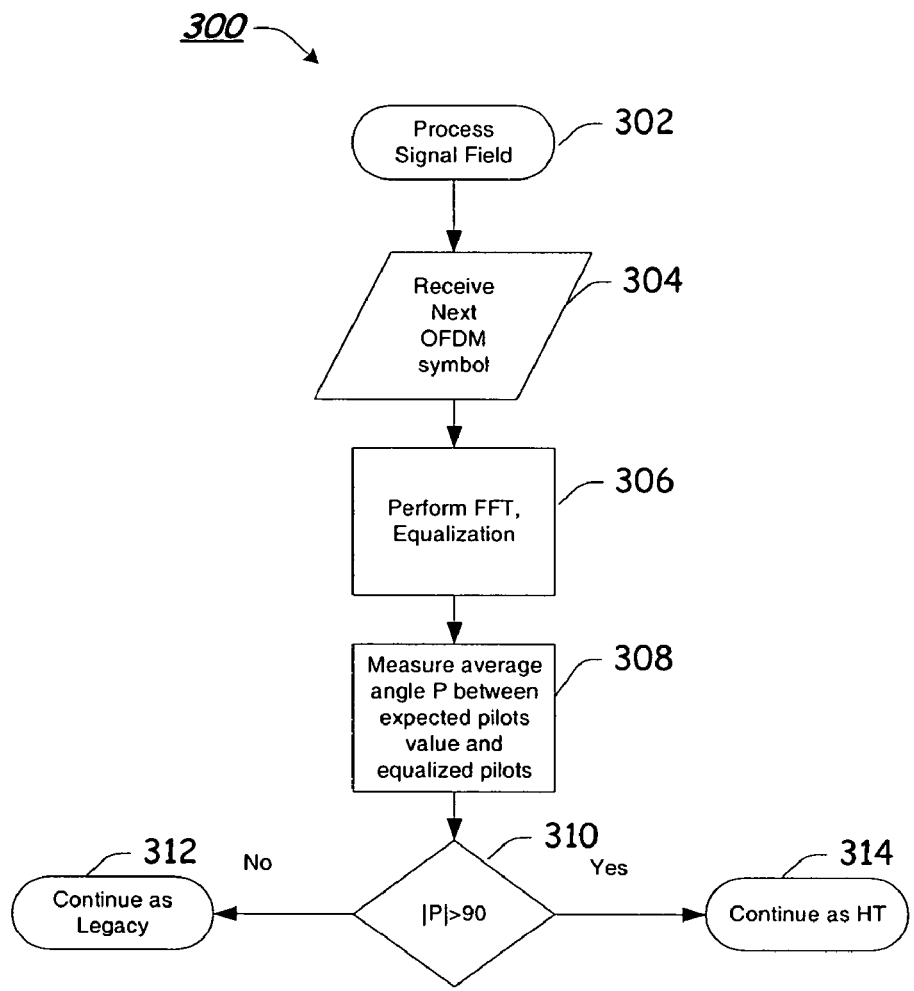
FIG. 3 is a flow chart of an example method for identifying system type(s) within a heterogeneous communication system, according to but one embodiment.

With continued reference to FIGS. 1 and 2, an example method to aid in system identification in a heterogeneous communication system is generally presented with reference to FIG. 3, according to but one example embodiment.

In accordance with the illustrated example embodiment of FIG. 3, the method begins with block 302 wherein a receiver (250) receives one or more signal(s) in a communication channel from a remote transmitter (200) and processes a signal field. To further illustrate this element, attention is directed to FIG. 4, wherein a graphical representation of both legacy (400) and non-legacy (420) datagram formats are depicted, according to one embodiment.

Figure 4:
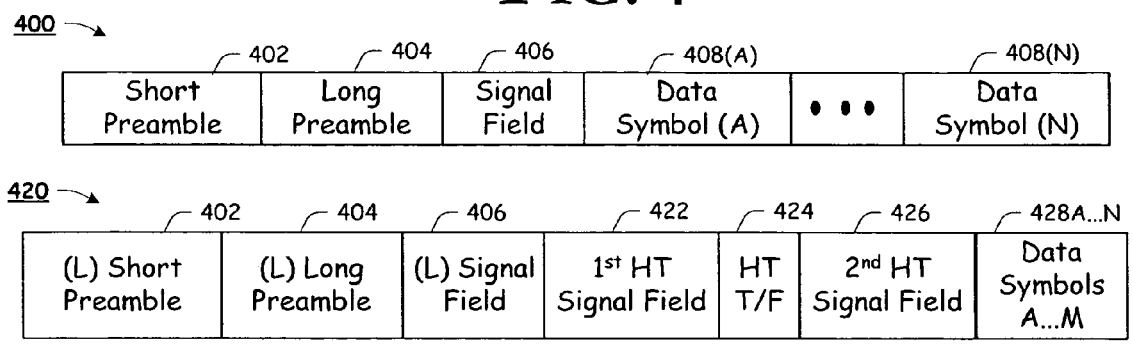
FIG. 4 is a graphical representation of an example legacy datagram format as well as a suggested non-legacy datagram format, according to one example embodiment.

Turning briefly to FIG. 4, a legacy datagram (e.g., symbol, packet, frame, etc.) format 400 is presented comprising one or more of a short-preamble field 402, a long preamble field 404, a signal field 406 and then zero or more data symbols 408A . . . N, arranged as depicted according to but an illustrative example. According to one embodiment, legacy datagram format 400 is consistent with the 802.11a packet format, although the scope of the invention is not limited in this regard.

In contrast to the legacy datagram format 400, a non-legacy datagram format 420 is also presented in FIG. 4. According to one embodiment, the non-legacy datagram format 420 may also include one or more of the legacy (L) short and long preamble fields (402, 404), and a legacy signal field (406). According to one embodiment, the inclusion of the legacy fields (402 406) enables a transmitting non-legacy device to nonetheless communicate with legacy devices, i.e., providing an element of backwards compatibility.

In addition to the legacy fields 402-406, the non-legacy datagram format 420 is also depicted comprising one or more of a first high-throughput (HT) signal field 422, a high-throughput training field 424, a second (HT) signal field 426 and zero or more data symbols 428A . . . N, although the scope of the invention is not limited in this regard.

Thus, with renewed reference to FIG. 3, the receiver 250 may receive the next OFDM symbol, block 304. As shown in FIG., 4, the signal field is part of both a legacy packet 400 and a HT packet 420. Some values of the legacy signal field (e.g., rate of 6 Mbps, etc.) may indicate that the next OFDM symbol may be associated with either a legacy or a non-legacy data packet, depending on the value of the pilots and/or the rotation of the whole OFDM symbol (e.g., Q-BPSK).

In block 306, receiver 250 may perform discrete Fourier transformation on the received symbol(s). In this regard, the content of the received channel is passed to DFT element(s)

258 for, e.g., fast Fourier transformation on the sub-carriers, transforming them from the time domain into a frequency domain. Once transformed, further equalization and demodulation may be performed (260), before at least a subset of the sub-carriers 261 may be passed to identification agent 262, to identify a system type associated with the communication channel.

In block 308, an instance of identification agent 262 may be invoked to analyze at least a subset of the received sub-carriers 261 to determine whether they are pilot-phase inverted. In this regard, according to one example technique, identification agent 262 may measure an average angle (P) between the expected pilot signal(s) and the equalized pilot signal(s) received. That is, if the equalized pilot signal(s) are represented as $X_1, X_2, X_3 \ldots X_N$ (including, perhaps, tracking correction), and the expected values for the pilot signals are represented as $V_1, V_2, V_3 \ldots V_N$, the average angle (P) between the (N) received pilot(s) and the (N) expected pilot(s) may be detected determined as:

$$P = \arctan\left(\sum_{i=1}^{N} w_i (X_i - V_i)\right) \quad (1)$$

where $w_i$ may reflect imperfections in the channel associated with the $i^{th}$ subcarrier. In this regard, $w_i$ may reflect variances of the noise associated with the $i^{th}$ pilot sub-carrier, or a function thereof. According to one embodiment, w is a function of the signal to noise ratio (SNR) of the $i^{th}$ subcarrier.

In response to the analysis above, identification agent 262 may determine whether the absolute average angle between the received pilot(s) and the expected pilot(s) exceeds some threshold, e.g., 90°, block 310. If so, pilot phase inversion has been performed and the received pilot signal(s) are indicative of a non-legacy communication channel. Accordingly, identification agent 262 may issue an indication, e.g., to a media access controller (MAC) associated with the receiver 250 to process the associated communication channel according to a non-legacy communication protocol (e.g., an 802.11n protocol), block 314, although the invention is not limited in this regard.

Alternatively, if identification agent 262 determines in block 310 that the average angle, e.g., the absolute average angle, between the received pilot(s) and the expected pilot(s) is less than 90°, pilot phase inversion has not been performed and the received pilots are indicative of a legacy communication channel. In this regard, identification agent 262 may issue an indication (e.g., to a MAC associated with the receiver 250) to process the communication channel according to a legacy communication protocol (e.g., an 802.11a or 802.11g protocol), block 312, although the invention is not limited in this regard.

Alternate Embodiment(s)

Figure 5:
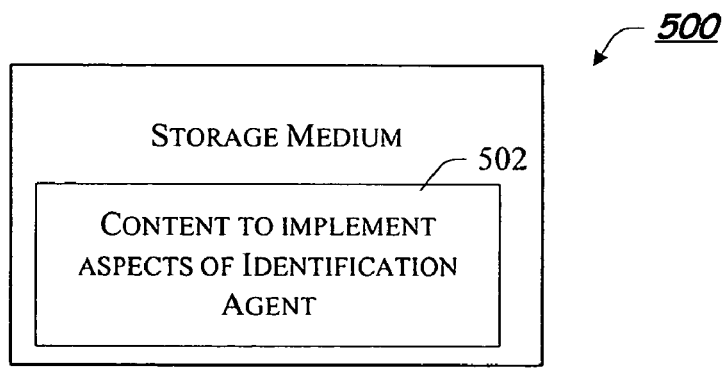
FIG. 5 is a block diagram of an example article of manufacture including content which, when executed by an accessing machine, causes the machine to implement one or more aspects of embodiment(s) of the invention.

FIG. 5 illustrates a block diagram of an example storage medium comprising content which, when invoked, may cause an accessing machine to implement one or more aspects of the identification agent 262 and/or associated methods 300. In this regard, storage medium 500 may include content 502 (e.g., instructions, data, or any combination thereof) which, when executed, causes an accessing appliance to implement one or more aspects of the identification agent 262 described above.

The machine-readable (storage) medium 500 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection). As used herein, all of such media is broadly considered storage media.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radio-telephone communication systems, satellite communication systems, two-way radio communication systems, one-way pagers, two-way pagers, personal communication systems (PCS), personal computers (PCs), personal digital assistants (PDAs), sensor networks, personal area networks (PANs) and the like, although the scope of the invention is not limited in this respect. Such devices may well be employed within any of a variety of Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, or may be embodied in machine-executable content (e.g., instructions), which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Any number of variations of the inventive concept are anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. A method comprising:
   generating a multicarrier communication channel for transmission to a legacy or a non-legacy receiver, wherein one or more pilot subcarrier(s) are phase inverted with respect to a phase of a legacy pilot subcarrier;
   selecting at least a subset of the pilot subcarriers for phase inversion; and
   modulating the selected pilot subcarriers by −1 times the value of legacy pilot subcarriers.

2. A method according to claim 1, wherein the generated multicarrier communication channel is generated by a non-legacy device.

3. A method according to claim 1, further comprising:
   transmitting the generated multicarrier communication channel to one or more remote receiver(s).

4. A method according to claim 1, wherein a non-legacy communication channel includes both legacy and non-legacy pilot subcarriers.

5. A storage medium comprising content which, when executed by an accessing device, causes the device to implement a method according to claim 1.

6. An apparatus comprising:
   a transmitter to generate a multicarrier communication channel for transmission to a legacy or a non-legacy receiver, wherein one or more pilot subcarrier(s) are phase inverted with respect to a phase of a legacy pilot subcarrier;
   a pilot signal generator, to generate one or more pilot signals that are phase inverted with respect to one or more generated legacy pilot signals and to modulate the one or more pilot signals by −1 times the value of legacy pilot subcarriers.

7. An apparatus according to claim 6, wherein the generated multicarrier communication channel is generated by a non-legacy device.

8. An apparatus according to claim 6, further comprising:
   one or more antenna(e) through which the multicarrier communication channel may be transmitted to a remote receiver.

9. An apparatus according to claim 6, further comprising:
   a processor element; and
   a storage medium, coupled with the processor element, including content which when executed by the processor element causes the device to implement the transmitter.

10. A system comprising:
    one or more substantially omnidirectional antenna(e); and
    a transmitter, coupled with the one or more substantially omnidirectional antenna(e) to generate a multicarrier communication channel for transmission to a legacy or a non-legacy receiver, wherein one or more pilot subcarrier(s) are phase inverted with respect to a phase of a legacy pilot subcarrier;
    a pilot signal generator, to generate one or more pilot signals that are phase inverted with respect to one or more generated legacy pilot signals and to modulate the one or more pilot signals by −1 times the value of legacy pilot subcarriers.

11. A system according to claim 10, wherein the generated multicarrier communication channel is generated by a non-legacy device.

* * * * *